(12) United States Patent
Berry et al.

(10) Patent No.: US 9,641,678 B2
(45) Date of Patent: May 2, 2017

(54) SYSTEM AND METHOD FOR INTERRUPTING AN INSTRUCTIONAL PROMPT TO SIGNAL UPCOMING INPUT OVER A WIRELESS COMMUNICATION LINK

(75) Inventors: Joseph J. Berry, Northville, MI (US); Mark Scalf, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1486 days.

(21) Appl. No.: 12/361,757

(22) Filed: Jan. 29, 2009

(65) Prior Publication Data

US 2010/0191535 A1 Jul. 29, 2010

(51) Int. Cl.
| | | |
|---|---|---|
| *G10L 15/00* | (2013.01) | |
| *H04M 3/493* | (2006.01) | |
| *G01C 21/36* | (2006.01) | |
| *B60R 16/037* | (2006.01) | |
| *G06F 3/16* | (2006.01) | |

(52) U.S. Cl.
CPC ....... *H04M 3/4936* (2013.01); *B60R 16/0373* (2013.01); *G01C 21/3608* (2013.01); *G06F 3/16* (2013.01); *G10L 15/00* (2013.01)

(58) Field of Classification Search
CPC ... B60R 16/0373; G01C 21/3608; G06F 3/16; H04M 1/271; H04M 3/4936; A63F 13/00; G10L 15/00; G10L 15/22; G10L 15/26
USPC ..... 704/231, 246, 251, 275, 270; 379/88.01; 701/1, 400
See application file for complete search history.

(56) References Cited

U.S. PATENT DOCUMENTS

| | | | |
|---|---|---|---|
| 6,539,078 B1* | 3/2003 | Hunt et al. | 379/88.04 |
| 6,668,221 B2 | 12/2003 | Harter, Jr. et al. | |
| 6,741,931 B1* | 5/2004 | Kohut | G01C 21/3688 340/993 |
| 6,842,677 B2 | 1/2005 | Pathare | |
| 6,903,652 B2 | 6/2005 | Noguchi et al. | |
| 7,194,069 B1* | 3/2007 | Jones et al. | 379/88.02 |
| 7,246,062 B2* | 7/2007 | Knott et al. | 704/246 |
| 7,337,113 B2* | 2/2008 | Nakagawa et al. | 704/233 |

(Continued)

FOREIGN PATENT DOCUMENTS

| | | |
|---|---|---|
| JP | 20070241122 | 9/2007 |
| JP | 20110088502 | 5/2011 |

OTHER PUBLICATIONS

Kermit Whitfield, "A hitchhiker's guide to the telematics ecosystem", Automotive Design & Production, Oct. 2003, http://findarticles.com, pp. 1-3.

(Continued)

*Primary Examiner* — Paras D Shah
(74) *Attorney, Agent, or Firm* — Jennifer M. Stec; Brooks Kushman P.C.

(57) ABSTRACT

A voice interactive session includes detection of an input signaling an interrupt to the session. When the interrupt is detected, instructional and or informational output is interrupted and detection of voice input begins. The voice input is not detected until the output is interrupted. Upon detection of a voice input (or other sound-based input), a determination may be made if the input was valid. If the input was valid, the input is processed, otherwise, instructional and/or informational output may be relayed again and/or the voice input may be redetected.

17 Claims, 3 Drawing Sheets

(56) References Cited

U.S. PATENT DOCUMENTS

| | | | |
|---|---|---|---|
| 7,565,230 B2 | 7/2009 | Gardner et al. | |
| 7,764,189 B2 | 7/2010 | Rubins et al. | |
| 7,783,475 B2 * | 8/2010 | Neuberger et al. | 704/10 |
| 7,826,945 B2 * | 11/2010 | Zhang et al. | 701/36 |
| 7,830,271 B2 | 11/2010 | Rubins et al. | |
| 7,881,940 B2 | 2/2011 | Dusterhoff | |
| 8,116,437 B2 * | 2/2012 | Stillman et al. | 379/88.04 |
| 8,285,453 B2 | 10/2012 | Schroeder et al. | |
| 8,502,642 B2 | 8/2013 | Vitito | |
| 2003/0004730 A1 * | 1/2003 | Yuschik | 704/275 |
| 2003/0055643 A1 * | 3/2003 | Woestemeyer et al. | 704/251 |
| 2003/0099335 A1 * | 5/2003 | Tanaka et al. | 379/88.16 |
| 2003/0220725 A1 | 11/2003 | Harter, Jr. et al. | |
| 2004/0176906 A1 | 9/2004 | Matsubara et al. | |
| 2004/0267534 A1 | 12/2004 | Beiermeister et al. | |
| 2005/0125110 A1 | 6/2005 | Potter et al. | |
| 2005/0215241 A1 | 9/2005 | Okada | |
| 2006/0142917 A1 | 6/2006 | Goudy | |
| 2007/0005368 A1 * | 1/2007 | Chutorash | B60R 16/0373 704/275 |
| 2007/0072616 A1 | 3/2007 | Irani | |
| 2007/0255568 A1 | 11/2007 | Pennock | |
| 2008/0070616 A1 | 3/2008 | Yun | |
| 2009/0085728 A1 | 4/2009 | Catten et al. | |
| 2009/0275281 A1 | 11/2009 | Rosen | |
| 2010/0191535 A1 | 7/2010 | Berry et al. | |
| 2010/0210254 A1 | 8/2010 | Kelly et al. | |
| 2010/0233959 A1 | 9/2010 | Kelly et al. | |
| 2010/0279626 A1 | 11/2010 | Bradley et al. | |
| 2011/0003587 A1 | 1/2011 | Belz | |
| 2011/0009107 A1 | 1/2011 | Guba et al. | |
| 2011/0021234 A1 | 1/2011 | Tibbitts et al. | |
| 2011/0076996 A1 | 3/2011 | Burton et al. | |
| 2011/0084852 A1 | 4/2011 | Szczerba | |
| 2011/0115616 A1 | 5/2011 | Caspe-Detzer et al. | |
| 2011/0115618 A1 | 5/2011 | Catten et al. | |
| 2011/0166748 A1 | 7/2011 | Schneider et al. | |
| 2012/0041633 A1 | 2/2012 | Schunder et al. | |

OTHER PUBLICATIONS

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

International Searching Authority, International Search Report and Written Opinion for the corresponding PCT Application No. PCT/US2009/69671 mailed Mar. 2, 2010.

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

* cited by examiner

SYSTEM AND METHOD FOR INTERRUPTING AN INSTRUCTIONAL PROMPT TO SIGNAL UPCOMING INPUT OVER A WIRELESS COMMUNICATION LINK

TECHNICAL FIELD

The illustrative embodiments generally relate to a system and method for interrupting an instructional prompt to signal upcoming input over a wireless communication link.

BACKGROUND

Modern technology and cost saving methodologies have lead to the implementation of numerous electronic menus, removing a live operator from a call and replacing the operator with an input driven menu. Many people have experienced this when calling, for example, a cable company, a credit card company, a phone company, etc. Even when calling a company to purchase a product, the electronic menus often occur.

Electronic menus can also be used to provide a range of informational services, for example. In one instance, a company called TELLME provides a call-in service where the caller can obtain information ranging from weather to news to sports score updates.

Electronic menus used to be primarily dual tone multiple frequency (DTMF) tone controlled. That is, a user was prompted to enter the number 1, 2, 3, etc. Entering a specific number activated a DTMF tone that corresponded to a particular menu choice.

As voice recognition technology has improved, some electronic menus have replaced the tone controls with voice controls. That is, instead of entering 1, the user will say "one". Other options with the voice based menus allow the user to ask for specific "named" options. For example, a user could call their bank and, instead of entering 2 for checking information, the user could, when prompted, say "checking information."

Hybrid menus also exist, allowing a choice between numeric entry using a keypad and voice-based entry. These might be desirable, for example, when a user is inputting a secure number in a public place, and doesn't wish to announce their social security number, for example, to bystanders.

Often times, it is also possible to interrupt the menu, by pushing an input button or speaking a command early. Menus designed to allow interruption simultaneously output information and listen for input at the same time.

SUMMARY OF ILLUSTRATIVE EMBODIMENTS

In one illustrative embodiment, a vehicle communication system includes a computer processor in communication with a wireless transceiver, capable of communication with a wireless communication device and located remotely from the processor.

The system also includes at least one output controllable by the processor. As one non-limiting example, this output could be the vehicle's speakers. Also included in the system is at least one input control in communication with the processor. In this illustrative embodiment, this input is a touch-controlled input, such as a steering wheel mounted button. The input control could be any suitable input, however.

The system also comprises a microphone in communication with the processor. This microphone can be used to enter, for example, verbal commands.

In this illustrative embodiment, the processor may connect to a remote network through the wireless communication device. The remote network can be a network providing user services, and the processor may further provide playback of a voice-controllable menu, retrieved from the remote network, though the output.

When the user desires to respond to the voice-controllable menu, to input a menu selection, for example, the user may activate the first input control, and the processor may detect activation of the input control. At this point, the processor may also cease playback of the menu and begin detection for a microphone input.

In a second illustrative embodiment, an automated menu system includes persistent and/or non-persistent memory. Also, a predetermined audio menu providing selectable menu options is stored in at least one of the persistent or non-persistent memory. The system further includes a processor, in communication with the persistent and non-persistent memory, to instruct delivery of the predetermined menu over a communication link. This delivery can be to, for example, a vehicle-based communication system.

At some point, a user may desire to input a verbal command, and activate an input signaling this desire. Accordingly, the processor may detect an interrupt instruction (such as may be provided upon input activation) received over the communication link.

Once the interrupt instruction is detected, the processor may cease delivery of the predetermined menu and to begin receiving a menu option selection over the communication link.

In yet another illustrative embodiment, a method of processing a voice interactive session includes providing instructions or information to be output. This could be, for example, a voice-selectable menu. While the information is provided, a first input may be detected.

In this illustrative embodiment, detection of the first input signals a desire to input a verbal command, so the providing is ceased upon input detection. At the same time, listening for a second input begins. Typically, the second input will correspond to a menu option desired for selection.

BRIEF DESCRIPTION OF THE DRAWINGS

Other aspects and characteristics of the illustrative embodiments will become apparent from the following detailed description of exemplary embodiments, when read in view of the accompanying drawings, in which.

DETAILED DESCRIPTION OF ILLUSTRATIVE EMBODIMENTS

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
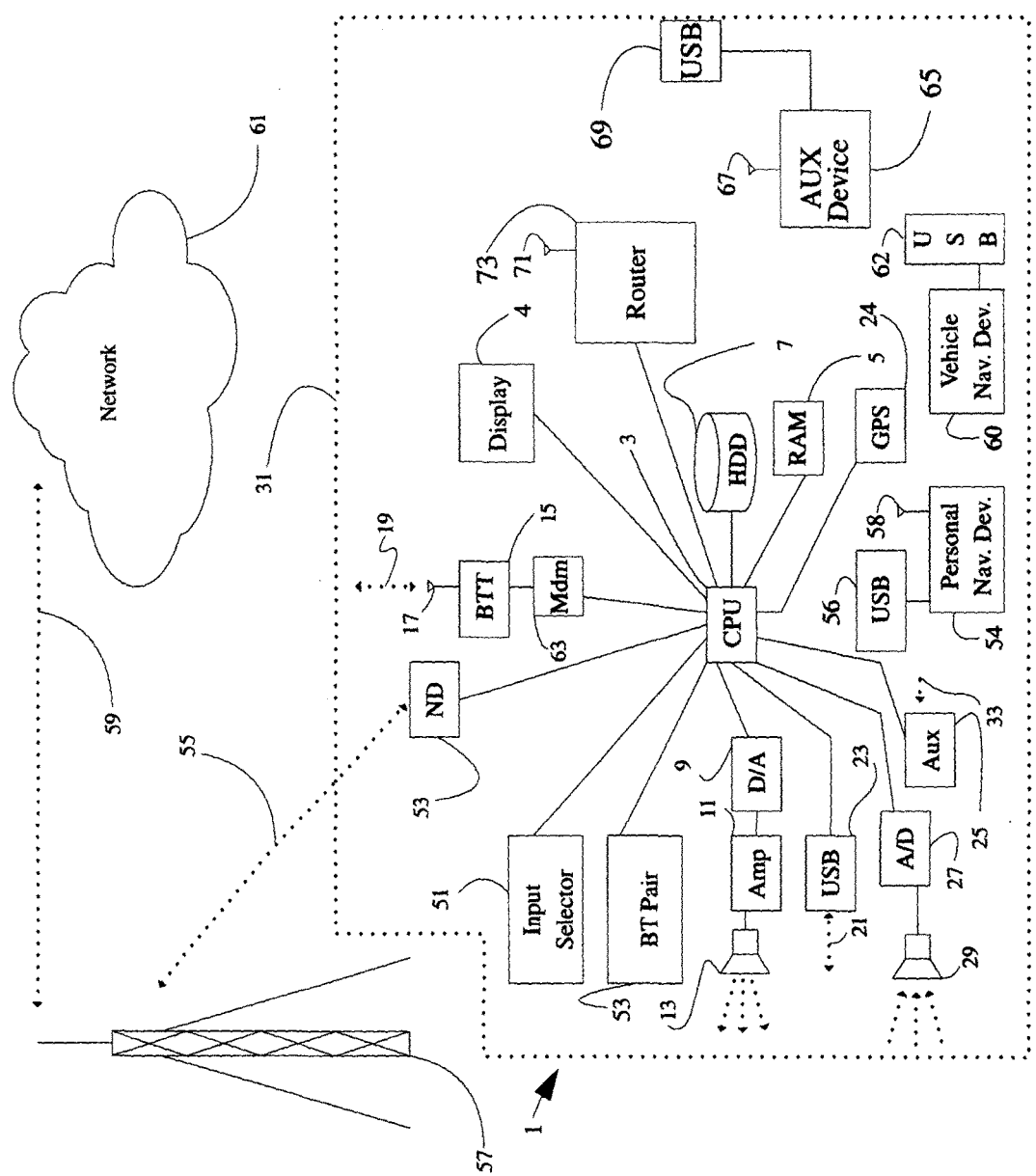
FIG. 1 shows an exemplary illustrative system usable for implementation of the illustrative embodiments.

FIG. 1 illustrates system architecture of an illustrative onboard communication system usable for delivery of information from network 61 to an automobile. A vehicle enabled with a vehicle-based computing system 31 may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Pairing a nomadic device 53 and the BLUETOOTH transceiver 15 can be instructed through a button 53 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
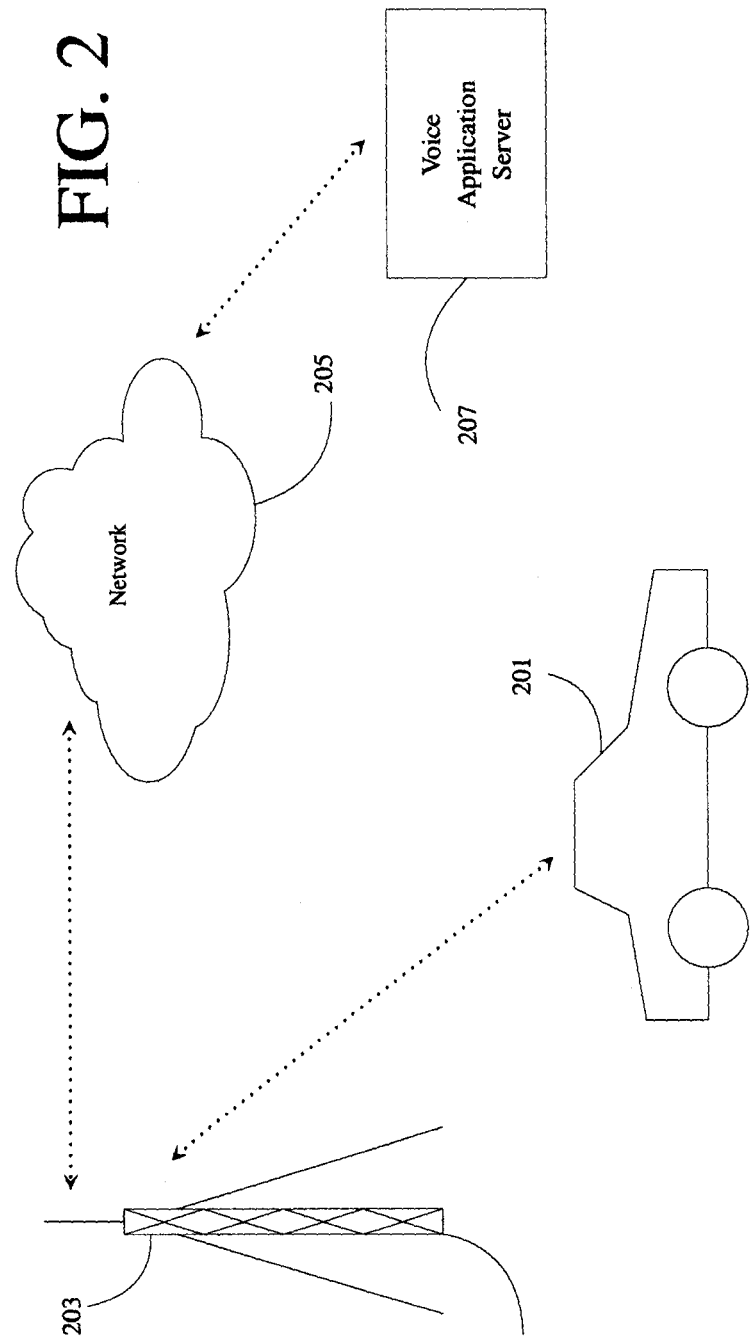
FIG. 2 shows an exemplary illustrative remote system in communication with a voice-menu system.

FIG. 2 shows an exemplary illustrative remote system in communication with a voice-menu system. A vehicle 201, outfitted, for example, with some or all of the components shown in FIG. 1, can travel around and the vehicle-system can remain in communication with a network 205 through, for example, cellular towers 203.

The network passes commands from the vehicle to various remote applications. One example of a remote application might be TELLME, which may be included on a voice application server 207. TELLME is an exemplary voice controlled application providing news, weather, stock updates, sports updates, etc. Information flows to and from applications such as TELLME to the nomadic device 53 located in the vehicle.

Figure 3:
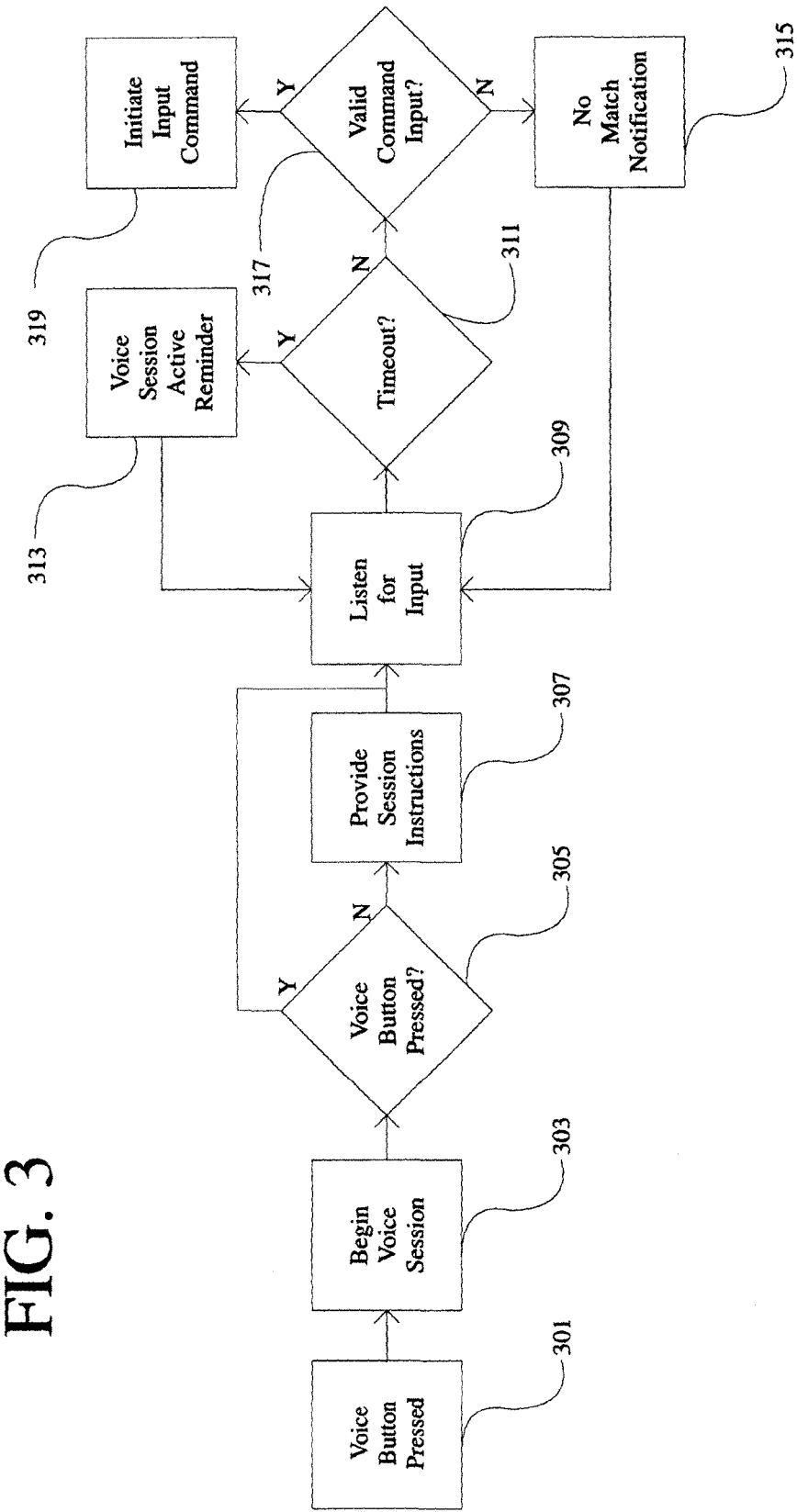
FIG. 3 shows one exemplary flow of an exemplary illustrative polling routine for determining if an upcoming voice input has been signaled.

FIG. 3 shows an exemplary illustrative polling routine for determining if an upcoming voice input has been signaled. Numerous possible routines could be used to determine if an interrupt signal is present, instructing the system to terminate spoken instructions and begin listening for voice or other input. The example shown in FIG. 3 is only one of many possible methods of polling.

In this illustrative embodiment, the system waits until it detects that a voice button has been pressed 301. One example of detection is based on a DTMF tone. In this illustrative embodiment, the DTMF tone for "*" key is sent when the voice button is pushed as a sinusoidal tone of two frequencies 941 Hz and 1240 Hz. Any DTMF tone could be used, however, or any other suitable method of detecting button input. The voice button has more than one functionality, in this illustrative embodiment, it at least signals the onset of a voice session and signals an interrupt to a played-back set of instructions. Once the voice button has been pressed, the voice session begins listening for user instruction 303.

In this illustrative embodiment, the voice session's beginning corresponds to a connection to TELLME, although any voice interactive application may be being accessed. The system checks to see if the voice button has been pressed again 305. If the voice button is pressed for a second time, the system begins listening for a command, without providing instructions. This allows sophisticated users to immediately enter a command without having to wait for familiar menus to be played back.

If the voice button is not pressed again, the system begins instruction playback 307. The instructions, for example, tell the user what menu options are available. Once the instructions have been provided, the system listens for input 309. As long as a timeout 311 has not occurred, the system checks to see if the input is valid 317. If the input is valid, the system initiates the input command 319.

If the input is not recognized, the system notifies the user that a match was not found 315 and returns to listening for input. If the timeout occurs, the system reminds the user to provide input and returns to listening for input.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A communication system in a vehicle, comprising:
   (a) a vehicle interior component having a touch-controlled button for signaling initiation of a voice request session within the vehicle;
   (b) a microphone integrated into the vehicle for receiving a voice request from a vehicle occupant during the voice request session;
   (c) a speaker integrated into the vehicle for outputting a response to the voice request;
   (d) a Bluetooth transceiver configured to pair and communicate with a portable cellular telephone; and
   (e) a computer processor configured to:
     (1) receive input from the touch-controlled button signaling initiation of a voice request session,
     (2) audibly output a voice menu including content defined at the voice server located remotely from the vehicle, and receive voice input from the vehicle occupant selecting the voice menu option;
     (3) receive a second signal initiated from a second consecutive press from the touch-controlled button to interrupt the voice menu;
     (4) listen for a voice command from the vehicle occupant without providing the voice menu to the user;
     (5) receive input from the microphone defining a voice request comprising the voice command from the vehicle occupant;
     (6) send the voice request using the Bluetooth transceiver over a broadband data communication network of the portable cellular telephone to a remotely-located voice server for processing the voice request;
     (7) receive a response to the voice request from the voice server using the Bluetooth transceiver; and
     (8) audibly output the response to the voice request through the speaker.

2. The system of claim 1 wherein the voice request is selected from a group consisting of: news, weather, stock updates and sports updates.

3. The system of claim 1 wherein content of the voice menu is defined at the voice server located remotely from the vehicle.

4. The system of claim 3 wherein the content of the voice menu is defined at the voice server located remotely from the vehicle.

5. The system of claim 1 wherein the vehicle interior component is a steering wheel.

6. The system of claim 1 wherein the response to the voice request includes an output indicating the voice request was not recognized.

7. The system of claim 1 wherein the processor is further configured to output information representing the response to the voice request through a visual display.

8. The system of claim 1 wherein the first signal is a first dual-tone multi-frequency (DTMF) signal associated with the portable cellular telephone.

9. The system of claim 8, wherein the second signal is a second DTMF signal associated with the portable cellular telephone.

10. A method of processing a voice interactive session in a vehicle communication system comprising:
   (a) initiating a voice request session in response to a signal from a touch-controlled button;
   (b) outputting a voice menu including content defined at the voice server located remotely from the vehicle, and receive input from the vehicle occupant selecting the voice menu option;
   (c) receiving a second signal initiated from a second consecutive press from the touch-controlled button to interrupt the voice menu;
   (d) listening for a voice command from the vehicle occupant without providing the voice menu to the user;
   (e) receiving a voice request comprising the voice command from a vehicle occupant during the voice request session via a microphone integrated into a vehicle;
   (f) pairing and communicating with a portable cellular telephone using a Bluetooth transceiver;
   (g) sending the voice request to thee remotely-located voice server for processing the voice request using the Bluetooth transceiver over a broadband data communication network of the portable cellular telephone;
   (h) receiving a response to the voice request from the voice server using the Bluetooth transceiver; and
   (i) outputting the response to the voice request through a the speaker integrated into the vehicle.

11. The method of claim 10 wherein the voice request is selected from a group consisting of: news, weather, stock updates and sports updates.

12. The method of claim 10 wherein the method further includes outputting a voice menu audibly and receiving voice input from the vehicle passenger selecting a voice menu option.

13. The method of claim 12 wherein content of the voice menu is defined at the voice server located remotely from the vehicle.

14. The method of claim 12 wherein content of the voice menu is defined at the voice server located remotely from the vehicle.

15. The method of claim 10 wherein outputting the response to the voice request includes an output indicating the voice request was not recognized.

16. The method of claim 10 wherein the method further includes outputting information representing the response to the voice request through a visual display.

17. The method of claim 10 wherein the vehicle interior component is a steering wheel.

* * * * *